United States Patent
Dehmas et al.

(10) Patent No.: US 9,231,653 B2
(45) Date of Patent: Jan. 5, 2016

(54) UWB RECEIVER WITH TIME DRIFT CORRECTION

(71) Applicants: Commissariat a l'energie atomique et aux energies alternatives, Paris (FR); BE SPOON, Bourget du Lac (FR)

(72) Inventors: Francois Dehmas, VIF (FR); Gilles Masson, Renage (FR); Laurent Ouvry, Grenoble (FR)

(73) Assignees: Commissariat à l'énergie atomique et aux énergies alternatives, Paris (FR); BE SPOON, Le Bourget du Lac (FR)

( * ) Notice: Subject to any disclaimer, the term of this patent is extended or adjusted under 35 U.S.C. 154(b) by 0 days.

(21) Appl. No.: 14/435,370

(22) PCT Filed: Oct. 10, 2013

(86) PCT No.: PCT/EP2013/071126
§ 371 (c)(1),
(2) Date: Apr. 13, 2015

(87) PCT Pub. No.: WO2014/060277
PCT Pub. Date: Apr. 24, 2014

(65) Prior Publication Data
US 2015/0303991 A1    Oct. 22, 2015

(30) Foreign Application Priority Data
Oct. 16, 2012  (FR) ...................................... 12 59864

(51) Int. Cl.
*H04B 1/707*     (2011.01)
*H04B 1/7163*    (2011.01)
(Continued)

(52) U.S. Cl.
CPC .............. *H04B 1/71637* (2013.01); *H04B 1/06* (2013.01); *H04L 27/22* (2013.01); *H04B 2201/70716* (2013.01)

(58) Field of Classification Search
USPC .......... 375/130, 375, 327, 340, 345; 370/516, 370/252
See application file for complete search history.

(56) References Cited

U.S. PATENT DOCUMENTS

| | | | | |
|---|---|---|---|---|
| 5,854,570 A | * | 12/1998 | Schmidt | .............. H04L 27/3872 329/304 |
| 2004/0076192 A1 | * | 4/2004 | Zerbe | ........................ G06F 1/10 370/516 |

(Continued)

FOREIGN PATENT DOCUMENTS

WO    2008/063132 A1    5/2008

OTHER PUBLICATIONS

U.S. Appl. No. 14/435,338, filed Apr. 13, 2015, Ouvry et al.
(Continued)

*Primary Examiner* — Eva Puente
(74) *Attorney, Agent, or Firm* — Oblon, McClelland, Maier & Neustadt, L.L.P.

(57) ABSTRACT

A UWB receiver with time drift correction. After a frequency translation by a quadrature demodulator, a pulsed UWB signal received is integrated on successive time windows, and then sampled. A phase shift estimator determines a phase difference between samples separated by a multiple of the sampling period approaching the period of the pulses of the signal. A controller deduces from this phase difference a time offset to be applied to integrators to synchronize the receiver on the signal received.

18 Claims, 3 Drawing Sheets

(51) Int. Cl.
*H04B 1/06* (2006.01)
*H04L 27/22* (2006.01)

(56) References Cited

U.S. PATENT DOCUMENTS

| | | | | |
|---|---|---|---|---|
| 2004/0120424 | A1* | 6/2004 | Roberts | H04B 1/7163 375/327 |
| 2010/0062726 | A1 | 3/2010 | Zheng et al. | |
| 2010/0142596 | A1 | 6/2010 | Kang et al. | |
| 2013/0163701 | A1* | 6/2013 | Buchwald | H03L 7/0814 375/340 |
| 2014/0243016 | A1 | 8/2014 | Denis et al. | |
| 2014/0256353 | A1 | 9/2014 | Denis et al. | |
| 2014/0287776 | A1 | 9/2014 | Denis et al. | |
| 2014/0362962 | A1* | 12/2014 | Meier | H03L 7/085 375/375 |

OTHER PUBLICATIONS

U.S. Appl. No. 14/739,072, filed Jun. 15, 2015, Dehmas et al.
Li Huang, et al., "Timing Tracking Algorithms for Impulse Radio (IR) Based Ultra Wideband (UWB) Systems", Wireless Communications, Networing and Mobile Computing, pp. 570-573, (Sep. 21, 2007) XP031261323.
Claude Desset, et al., "UWB Search Strategies for Minimal-Length Preamble and a Low-Complexity Analog Receiver", Signal Processing Advances in Wireless Communications, Total 5 Pages, (Jul. 1, 2006) XP031077949.
Zheng Yuanjin, et al., "A New Synchronization Algorithm for UWB Impulse Radio Communication Systems", Communications Systems, pp. 25-29, (Sep. 6, 2004) XP010743276.
International Search Report Issued Jan. 20, 2014 in PCT/EP13/071126 Filed Oct. 10, 2013.
French Search Report Issued Jun. 12, 2013 in French Application No. 1259864 Filed Oct. 16, 2012.

* cited by examiner

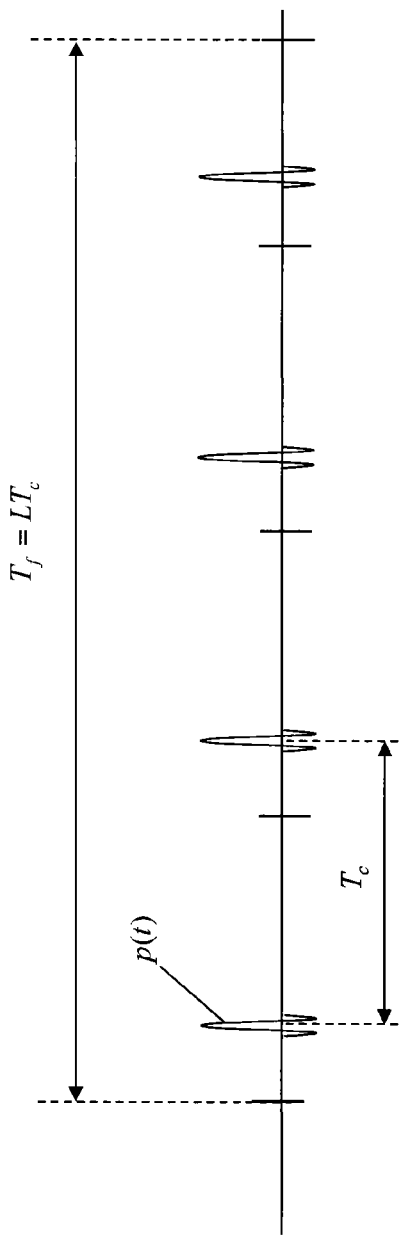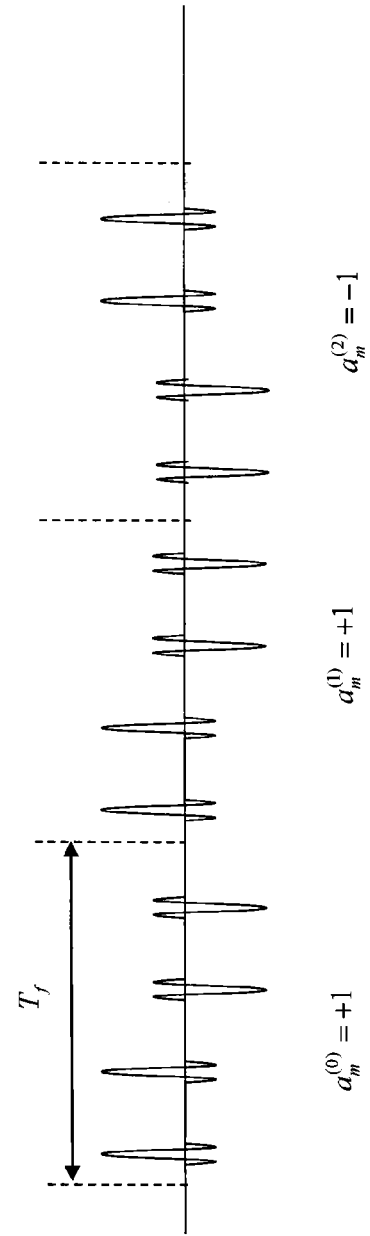

UWB RECEIVER WITH TIME DRIFT CORRECTION

TECHNICAL FIELD

The present invention relates to the field of UWB (Ultra Wide Band) receivers and more particularly to the synchronization of such receivers.

STATE OF PRIOR ART

Pulsed type ultra-wide band or UWB telecommunication systems are well known in the state of the art. In such a system, a symbol emitted by a transmitter is transmitted using a sequence of ultra-short pulses, in the order of one nanosecond or about a hundred picoseconds.

FIG. 1A schematically illustrates the signal transmitted by a UWB transmitter, corresponding to a given information symbol. This signal consists of pulses being repeated with a repetition period $T_c$.

The signal emitted by the transmitter, in the absence of a modulation by modulation symbols, can be expressed in the following form:

$$s_{Tx}(t) = \sum_{k=0}^{L-1} p(t - kT_c)\cos(2\pi f_0(t - kT_c) + \varphi_0) \quad (1)$$

where p(t) is the form of the unit pulse in baseband, $f_0$ is the carrier frequency, $\phi_0$, Ia the phase at the origin, and $T_c$ the repetition period. The duration $\tau$ of the unit pulse p(t) is substantially lower than the duration of the period $T_c$.

This base signal can be amplitude and/or position modulated to transmit a symbol per symbol period, each symbol period consisting of a given number of repetition periods. The symbol period has a duration $T_f=LT_c$ where L is an integer. For example, if the modulation is a position modulation (PPM for Pulse Position Modulation), the modulated signal can be expressed in the form:

$$s_{Tx}(t) = \sum_{k=0}^{L-1} p(t - kT_c - m\varepsilon)\cos(2\pi f_0(t - kT_c - m\varepsilon) + \varphi_0) \quad (2)$$

where $\epsilon$ is a modulation delay substantially lower than the period $T_c$ and m=0, ..., M-1 is the PPM M-ary position of the symbol.

In a similar way, a symbol can be transmitted by the UWB transmitter by means of an amplitude or phase modulation to which the modulated signal can therefore be expressed in the form:

$$s_{Tx}(t) = \sum_{k=0}^{L-1} a_m p(t - kT_c)\cos(2\pi f_0(t - kT_c) + \varphi_0) \quad (3)$$

where $a_m$ is the symbol to be transmitted, for example a PAM (Pulse Amplitude Modulation) or (D)BPSK ((Differential) Binary Phase Shift Keying) symbol.

To separate the transmissions of different transmitters, it can be contemplated each transmitter can be provided associated with a given code $c_k$, k=0, ..., L-1, with the proviso that the codes relating to different transmitters are orthogonal.

In this case, the signals transmitted in position modulation and amplitude position become respectively, for the same symbol to be transmitted:

$$s_{Tx}(t) = \sum_{k=0}^{L-1} c_k p(t - kT_c - m\varepsilon)\cos(2\pi f_0(t - kT_c - m\varepsilon) + \varphi_0) \quad (4)$$

and $$s_{Tx}(t) = a_m\sum_{k=0}^{L-1} c_k p(t - kT_c)\cos(2\pi f_0(t - kT_c) + \varphi_0) \quad (5)$$

Finally, for a series of successive symbols i=0, ..., N, the signal transmitted can be written as:

$$s_{Tx}(t) = \sum_{i=0}^{N-1}\sum_{k=0}^{L-1} c_k p(t - (k+iL)T_c - m^{(i)}\varepsilon)\cos(2\pi f_0(t - (k+iL)T_c - m^{(i)}\varepsilon) + \varphi_0) \quad (6)$$

and $$s_{Tx}(t) = \sum_{i=0}^{N-1} a_m^{(i)}\sum_{k=0}^{L-1} c_k p(t - (k+iL)T_c)\cos(2\pi f_0(t - (k+iL)T_c) + \varphi_0) \quad (7)$$

where $m^{(i)}$ and $a_m^{(i)}$, i=0, ..., N-1 are the PPM and PAM symbols respectively.

FIG. 1B illustrates an example of a UWB pulsed signal, using a BPSK modulation. The code of the transmitter is here $c_0$=+1, $c_1$=+1, $c_2$=-1, $c_3$=-1 and the successively transmitted symbols are $a_m^{(0)}$=+1; $a_m^{(1)}$=+1; $a_m^{(2)}$=-1.

Whatever the modulation type, the receiver has to adjust in frequency and in time with the received signal. More precisely, the receiver operates a translation in baseband using a frequency $f_1$, which can be slightly different from the carrier frequency $f_0$. Then, he has to synchronize time windows for integrating the receiver on the time positions of the pulses of the signal translated in baseband. The time windows are spaced by a repetition period $T_1$ which can slightly differ from the repetition period of the pulses, $T_c$. In the following, the deviation $\delta f = f_1 - f_0$ will be referred to as frequency offset of the receiver and the deviation $\delta T = T_1 - T_c$ will be referred to as the time offset of the receiver. The synchronization of the receiver on the received signal is particularly difficult to achieve as regards the very short duration of the base pulse.

The frequency regulation of the receiver is generally achieved thanks to a Phase Locked Loop (PLL) and the position regulation of the time windows thanks to a Delay Locked Loop (DLL). Application US2010/0142596 describes in particular a delay locked loop for a UWB receiver. This DLL loop uses three correlators in parallel, respectively correlating the signal received with a code sequence, in advance, synchronous and with a delay with respect to the received signal. The powers at the output of the different correlators enable the loop to temporally adjust with the received signal. However, such a time regulation is complex because it requires in the case described, on the one hand, a filtering suitable for the symbol, which has to be carried out in an analog way and, on the other hand, three distinct processing ways for the signal received. Further, such a system does not operate properly when the transmission channel is a multi-path one, since making a RAKE in an analog way is very delicate.

The purpose of the present invention is to provide a UWB receiver which allows a simple and robust synchronization on the received signal.

DISCLOSURE OF THE INVENTION

The present invention is defined by a receiver for receiving a pulsed UWB signal transmitting symbols with a first period $(T_c, LT_c)$, modulated by a carrier frequency $(f_0)$, said receiver comprising:

- a quadrature mixer for translating in baseband said pulsed UWB signal, from the signal of a local oscillator of a frequency $(f_1)$ equal to, within a frequency offset, to said carrier frequency;
- an integration stage for integrating the signal thus translated in baseband, during successive time windows being repeated with a second period $(T_w)$, the first period being equal, within a time offset, to a multiple $(q, Lq)$ of the second period;
- a sampling stage for sampling the signal thus integrated, a sample representing the integration result of the signal translated on the second period;
- a phase estimator for estimating the phase shift between two samples of the integrated signal, which are separated by said multiple of the second period;
- control means applying a time offset to the time windows of the integration stage as a function of the phase offset previously estimated.

Advantageously, said receiver comprises upstream of the quadrature mixer an RF filter followed by a low noise amplifier.

The quadrature mixer can be followed by a low-pass filtering stage upstream of the integration stage.

According to a first embodiment, the pulsed signal comprises a pulse being repeated with the first period $T_c$ and the integration windows are repeated with a second period $T_w$, substantially lower than $T_c$, the phase estimator estimating said phase shift, $\Delta\phi$, between two samples of the integrated signal, which are separated by a time interval $T_1 = qT_w$, where q is an integer, the deviation $T_1 - T_c$ defining said time offset.

According to a first alternative, the control means apply to the integration windows a time offset $-\delta t = (\Delta\phi/2\pi Q)T_1$ where Q is an integer equal to the product of the time interval $T_1$ by the frequency $(f_1)$ of the local oscillator, the time offset being applied with a periodicity $T_1$.

According to a second alternative, the control means accumulate the phase shifts provided by said phase estimator for a plurality $n_T$ of said successive time intervals, to obtain a cumulative phase shift $\Delta\Phi$, and apply to the integration windows a time offset $-\Delta t = (\Delta\Phi/2\pi Q)T_1$, where Q is an integer equal to the product of the time interval $T_1$ by the frequency $(f_1)$ of the local oscillator, the time offset being applied with a periodicity $n_T T_1$.

According to a third alternative, the control means accumulate the phase shifts provided by said phase estimator for a plurality of said successive time intervals, to obtain a cumulative phase shift $\Delta\Phi$, until the time offset $-\Delta t = (\Delta\Phi/2\pi Q)T_1$ corresponds to a value equal to said second period, where Q is an integer equal to the product of the time interval $T_1$ by the frequency $(f_1)$ of the local oscillator, a time offset of this second period being then applied when this value is reached.

According to a second embodiment, the pulsed signal comprises a series of L pulses separated by a period $T_c$, said series being repeated with the first period $LT_c$, each series of pulses being coded using a coding sequence $(c_k)$ and modulated by a modulation symbol $(a_m^{(i)})$, and that the integration windows are repeated with a second period $T_w$, substantially lower than $T_c$, the phase estimator estimating said phase shift, $\Delta\phi$, between two samples of the integrated signal, which are separated by a time interval $T_1 = qLT_w$, where q is an integer, the deviation $L(T_1 - T_c)$ defining said time offset.

According to a first alternative, the control means apply to the integration windows a time offset $-\delta t = (\Delta\phi/2\pi Q)LT_1$ where Q is an integer equal to the product of the time interval $T_1$ by the frequency $(f_1)$ of the local oscillator, the time offset being applied with a periodicity $LT_1$.

According to a second alternative, the control means accumulate the phase shifts provided by said phase estimator for a plurality $n_T$ of said successive time intervals, to obtain a cumulative phase shift $\Delta\Phi$ and apply to the integration windows a time offset $-\Delta t = (\Delta\Phi/2\pi Q)LT_1$, where Q is an integer equal to the product of the time interval $T_1$ by the frequency $(f_1)$ of the local oscillator, the time offset being applied with a periodicity $n_T LT_1$.

According to a third alternative, the control means accumulate the phase shifts provided by said phase estimator for a plurality of said successive time intervals, to obtain a cumulative phase shift $\Delta\Phi$, until the time offset $-\Delta t = (\Delta\Phi/2\pi Q)LT_1$ corresponds to a value equal to said second period, where Q is an integer equal to the product of the time interval $T_1$ by the frequency $(f_1)$ of the local oscillator, a time offset of this second period being then applied when this value is reached.

The present invention is also defined by a method for receiving a pulsed UWB signal transmitting symbols with a first period $(T_c, LT_c)$, modulated by a carrier frequency $(f_0)$, said method comprising the following steps of:

- quadrature mixing for translating in baseband said pulsed UWB signal, from the signal of a local oscillator of the frequency $(f_1)$ equal, within a frequency offset, to said carrier frequency;
- integrating the signal thus translated in baseband, for successive time windows being repeated with a second period $(T_w)$, the first period being equal, within a time offset, to a multiple $(q, Lq)$ of the second period;
- sampling the signal thus integrated, a sample representing the integration result of the signal translated on the second period;
- phase estimating for estimating the phase shift between two samples of the integrated signal, which are separated by said multiple of the second period;
- a step of applying a time offset to the time windows of the integration stage as a function of the phase offset previously estimated.

According to a first embodiment, the pulsed signal comprises a pulse being repeated with the first period $T_c$ and the integration windows are repeated with a second period $T_w$, substantially lower than $T_c$, the phase estimation estimating said phase shift, $\Delta\phi$, between two samples of the integrated signal, which are separated by a time interval $T_1 = qT_w$, where q is an integer, the deviation $T_1 - T_c$ defining said time offset.

According to a first alternative, the time offset is obtained by $-\delta t = (\Delta\phi/2\pi Q)T_1$ where Q is an integer equal to the product of the time interval $T_1$ by the frequency $(f_1)$ of the local oscillator, the time offset being applied with a periodicity $T_1$.

According to a second alternative, for a plurality $n_T$ of said successive time intervals, the phase shifts provided by said phase estimation are accumulated, to obtain a cumulative phase shift $\Delta\Phi$, and to the integration windows is applied a time offset $-\Delta t = (\Delta\Phi/2\pi Q)T_1$, where Q is an integer equal to the product of the time interval $T_1$ by the frequency ($f_1$) of the local oscillator, the time offset being applied with a periodicity $n_T T_1$.

According to a third alternative, for a plurality of said successive time intervals, the phase shifts provided by said phase estimation are accumulated, to obtain a cumulative phase shift $\Delta\Phi$, until the time offset $-\Delta t=(\Delta\Phi/2\pi Q)T_1$ corresponds to a value equal to said second period, where Q is an integer equal to the product of the time interval $T_1$ by the frequency ($f_1$) of the local oscillator, a time offset of this second period being then applied when this value is reached.

According to a second embodiment, the pulsed signal comprises a series of L pulses separated by a period $T_c$, said series being repeated with the first period $LT_c$, each series of pulses being coded using a coding sequence ($c_k$) and modulated by a modulation symbol ($a_m^{(i)}$), and the integration windows being repeated with a second period $T_w$, substantially lower than $T_c$, the phase estimation estimating said phase shift, $\Delta\phi$, between two samples of the integrated signal, which are separated by a time interval $T_1=qLT_w$, where q is an integer, the deviation $L(T_1-T_c)$ defining said time offset.

To the integration windows can then be applied a time offset $-\delta t=(\Delta\phi/2\pi Q)LT_1$ where Q is an integer equal to the product of the time interval $T_1$ by the frequency ($f_1$) of the local oscillator, the time offset being applied with a periodicity $LT_1$.

BRIEF DESCRIPTION OF THE DRAWINGS

Further characteristics and advantages of the invention will appear upon reading a preferential embodiment of the invention made in reference to the appended figures wherein:

FIG. 1A, already described, represents an exemplary pulsed type UWB signal;

FIG. 1B, already described, represents an exemplary modulated pulsed type UWB signal;

DETAILED DISCLOSURE OF PARTICULAR EMBODIMENTS

In the following, a UWB receiver and more precisely a receiver for receiving a pulsed type UWB signal will be considered.

For the sake of simplification of the presentation and without loss of generality, it will be first considered that the pulsed UWB signal is not modulated. This signal is in baseband as a periodical sequence of ultra-short pulses (in the order of a fraction of one nanosecond to a few nanoseconds), separated by a repetition period $T_c$. It will be supposed, in the general case, that the signal in baseband is then frequency translated by modulation of a carrier at the frequency $f_0$. No particular relationship is assumed between the repetition period and the carrier frequency. The signal transmitted by the transmitter is then given by the expression (1).

It will be assumed that the transmission channel is a multi-path one, in other words, that its pulsed response can be expressed in the form:

$$h(t) = \sum_{p=0}^{P-1} h_p \delta(t-t_p) \quad (8)$$

where P is the number of the channel paths, and $h_p$, $t_p$ are the attenuation coefficient and the path delay p respectively, $\delta(\cdot)$ is the Dirac symbol.

The signal received by the receiver, noted $s_{Rx}$, can then be expressed in the form:

$$s_{Rx}(t) = \sum_{k=0}^{L-1} \sum_{p=0}^{P-1} h_p p(t-t_p-kT_c)\cos(2\pi f_0(t-t_p-kT_c)+\varphi_0) + n(t) \quad (9)$$

where n(t) is the noise at the receiver.

Figure 2A:
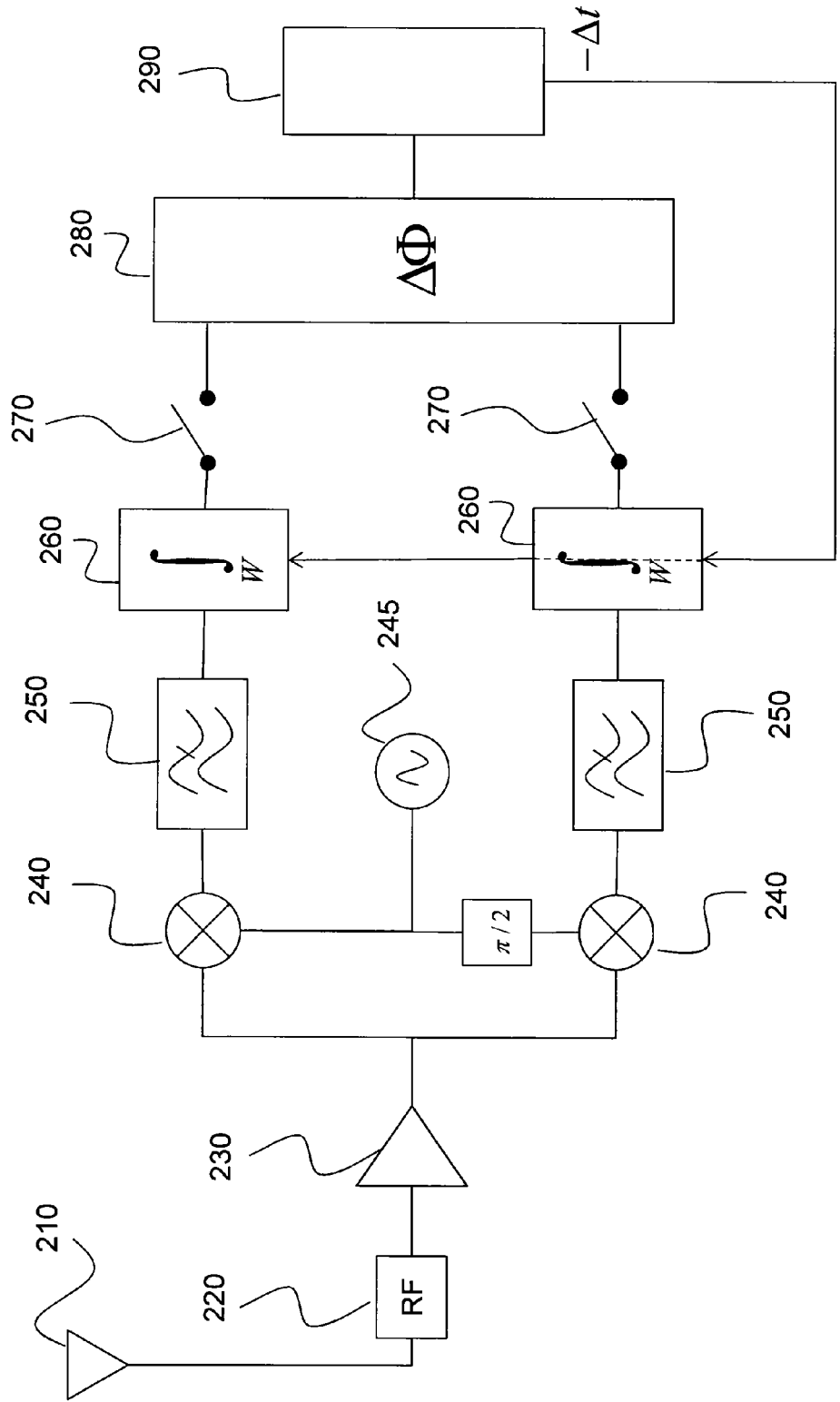
FIG. 2A schematically represents the structure of a UWB receiver according to a first embodiment of the invention.

FIG. 2A schematically illustrates the structure of a UWB receiver according to one embodiment of the invention.

The signal $s_{Rx}$ received by the antenna 210 is filtered by an RF filter 220 and then amplified by a low noise amplifier (LNA), 230, before being translated in baseband by means of a quadrature mixer, 240.

The mixer uses a frequency $f_1$, provided by the local oscillator 245, ideally equal to $f_0$ but in practice shifted by an offset, due to the drift of the oscillator. The in-phase and phase quadrature signals are then filtered using low-pass (or band-pass) filters 250, and then integrated, by an integration stage 260, on successive time windows of width $T_w$. The time windows follow each other with a periodicity $T_w$. After integration, the in-phase and quadrature signals are sampled at the frequency $1/T_w$ by the sampling stage 270. According to an alternative not illustrated, the time windows follow each other with a periodicity $T_w/K$ (K integrators in parallel are provided on each of the channels I and Q, each integrator output being sampled in turn), which results in an overlapping rate of (K−1)/K between successive windows. Without loss of generality, it will be assumed in the following that the windows are without overlapping (K=1). In practice, since the UWB signal is null almost everywhere, we could simply sample the in-phase and quadrature signals in time intervals centered on the time positions of the pulses.

The phase detector 280 receives the complex successive samples obtained (on the channels I and Q) and the phase offset is between two samples separated by q sampling periods, where $qT_w \cong T_c$, is deduced therefrom.

The receiver further comprises control means 290 receiving the phase shift provided by the detector 280 and controlling the position of the integration window as well as the sampling instant. The control means 290 operate as a delay locked loop (DLL) by delaying more or less the beginning of the integration window with respect to the received signal and, correlatively, the sampling instant.

The operation of the control means is explained hereinafter.

After quadrature mixing and bandpass filtering, the complex signal, before integration in 260, is given by:

$$r(t) = \sum_{k=0}^{L-1} \sum_{p=0}^{P-1} h_p p(t-t_p-kT_c)\exp(j2\pi(f_0-f_1)t - j2\pi f_0(t_p+kT_c) + j(\varphi_0-\varphi_1)) + n_1(t) \quad (10)$$

-continued $$= \sum_{k=0}^{L-1} p_r(t - kT_c) \exp(j2\pi(f_0 - f_1)t - j2\pi f_0 kT_c +$$

$$j(\varphi_0 - \varphi_1)) + n_1(t)$$

where $n_1(t)$ is the mixed and filtered noise, $\phi_1$ is the local oscillator phase, and by setting:

$$p_r(t) = \sum_{p=0}^{P-1} h_p p(t - t_p) \exp(-j2\pi f_0 t_p) \quad (11)$$

The signal r(t) is integrated during successive integration windows of duration $T_w$. In other words, the time is cut into successive windows $W_n = [t_0 + nT_w, t_0 + (n+1)T_w]$ where $t_0$ is an instant giving the starting point of the integration. It will be understood that a $t_0$ variation offsets the integration windows with respect to the received signal.

The complex signal after integration in the window $W_n$ is noted $r_w[n]$ where $$r_w[n] = \int_{t_0+nT_w}^{t_0+(n+1)T_w} r(t) dt.$$

If we assume that the support of $p_r(t)$ is lower than $T_c$, in other words, that there is no inter-pulse interference due to the multiple paths (in the reverse case, the interference can be considered as a component of the noise), the value $r_w[n]$ is reduced to:

$$r_w[n] = \int_{t_0+nT_w}^{t_0+(n+1)T_w} (p_r(t - k_n T_c) \times \quad (12)$$

$$\exp(j2\pi(f_0 - f_1)t - j2\pi f_0 k_n T_c + j(\varphi_0 - \varphi_1)) + n_1(t)) dt$$

where $k_n$ is the integer such that $p_r(t-k_n T_c)$ is not null everywhere on the integration window $W_n$ (there is at least one integer $k_n$ respecting this property on the repetition period of the pulses). Given that the repetition period of the pulses, $T_c$, is in the order of a multiple of the duration of the integration window ($T_c \cong qT_w$), the integer $k_n$ respecting the previously condition is unique.

The synchronization of the receiver requires acknowledge of the integer q such that $T_1 = qT_w$ best approaches the period of the pulses, $T_c$. If there is $T_1 \cong T_c$, the coverage configuration of the function $p_r(t)$ with the integration windows is repeated after q windows, in other words $k_{n+q} = k_n + 1$ and:

$$r_w[n+q] = \int_{t_0+nT_w}^{t_0+(n+1)T_w} (p_r(t + T_1 - (k_n+1)T_c) \times \quad (13)$$

$$\exp(j2\pi(f_0 - f_1)(t + T_1) - j2\pi f_0(k_n+1)T_c + j(\varphi_0 - \varphi_1))) dt$$

where the noise term has been omitted.

The value $r_w[n+q]$ can be equivalently written as:

$$r_w[n+q] \int_{t_0+nT_w+T_1-T_c}^{t_0+(n+1)T_w+T_1-T_c} (p_r(t - k_n T_c) \times \quad (14)$$

$$\exp(j2\pi(f_0 - f_1)(t + T_c) - j2\pi f_0(k_n+1)T_c + j(\varphi_0 - \varphi_1))) dt$$

We assume that $T_1 \cong T_c$, and more precisely that $|T_1 - T_c| \ll T_w$, hence:

$$r_w[n+q] \simeq \int_{t_0+nT_w}^{t_0+(n+1)T_w} (p_r(t - k_n T_c) \times \quad (15)$$

$$\exp(j2\pi(f_0 - f_1)(t + T_c) - j2\pi f_0(k_n+1)T_c + j(\varphi_0 - \varphi_1))) dt$$

the equality being exact if $T_1 = T_c$ or if the received signal is null at the edges of the integration window. Finally, there is:

$$r_w[n+q] \cong r_w[n] \exp(-j2\pi f_1 T_c) \quad (16)$$

The relationship (16) expresses the phase shift between two integration results separated by q integration windows. The integration results are obtained at the output of the samplers 270 and the detector 280 determines the phase shift between samples separated by q sampling periods $T_w$:

$$\Delta\phi = \arg(r_w[n+q] r_w^*[n]) = -2\pi f_1 T_c \quad (17)$$

If $\delta = \dfrac{T_1 - T_c}{T_1}$ represents the relative deviation between the period, $T_c$, of the pulses transmitted by the transmitter and the period, $T_1$, used by the receiver and taking into account that $f_1 T_1$ is generally an integer Q (the period $T_1$ is obtained by dividing a clock frequency at the frequency $f_1$), the phase shift $\Delta\phi$ can be expressed as a function of the abovementioned relative deviation modulo $2\pi$:

$$\Delta\phi = -2\pi Q\delta[2\pi] \quad (18)$$

It will be understood that the phase shift $\Delta\phi$ reflects a time sliding $(-\Delta\phi/2\pi Q)T_1$ of the integration windows with respect to the received signal, said time sliding being here determined by the detector with a periodicity $T_1$. The time sliding can be unambiguously determined, without folding, if $|\Delta\phi| < \pi$ that is $$|\delta| < \frac{1}{2Q}.$$

The synchronization of the receiver consists in correcting this time sliding. To that end, the control means 290 vary the beginning of the integration windows as a function of the phase shift determined by the detector 280. If the time sliding is $\delta t = (-\Delta\phi/2\pi Q)T_1$, the beginning of the integration windows will be offset by $-\delta t = (-\Delta\phi/2\pi Q)T_1$. It will be noted that the correction of the time sliding by the control means is herein carried out with a periodicity $T_1$. When necessary, the beginning of the integration windows can be advanced or delayed by a multiple of a time step $\delta T_w$, the sampling instant being therefore advanced or delayed accordingly.

Advantageously, the control means, 290, carry out an accumulation of the phase shifts $\Delta\phi$ obtained on a plurality $n_T$ of successive periods $T_1$:

$$\Delta\Phi = \sum_{n=0}^{n_T-1} \Delta\phi_n \tag{19}$$

The cumulative time offset (by vernier effect) on $n_T$ successive periods can be determined as previously by:

$$\Delta t = (-\Delta\Phi/2\pi Q)T_1 \tag{20}$$

With a periodicity $n_T T_1$, the control means 180 compute the cumulative time sliding and offset the beginning of the integration windows and the sampling instants by a time $-\Delta t = (\Delta\Phi/2\pi Q)T_1$.

Alternatively, the time sliding could be cumulated until it reaches a sampling period $T_w$, the windows being then offset by this period.

It will be noted that the correction of the time sliding is carried out by the control means 290. If the offset is carried out by a multiple step of a time step $\delta T_w$, the correction to be applied is $$\left\lfloor \frac{\Delta t}{\delta T_w} \right\rfloor$$

time steps where $$\lfloor x \rfloor$$

designates the integer value of x.

It is understood that the receiver can thus constantly correct its time drift with respect to the received signal. The samples provided by the sampling stage 270 are then synchronous with the pulses of the received signal and can be processed by the receiver.

It has been assumed in the first embodiment that the signal transmitted by the transmitter was not modulated (expression (1)).

Now it is assumed, in a second embodiment, that the signal transmitted is modulated, for example by symbols belonging to a BPSK or DBPSK modulation (expression (7)):

$$s_{Tx}(t) = \sum_{i=0}^{N-1} a_m^{(i)} \sum_{k=0}^{L-1} c_k p(t - (k + iN_c)T_c)\cos(2\pi f_0(t - (k + iN_c)T_c) + \varphi_0) \tag{21}$$

where it is reminded that $a_m^{(i)}$, i=0, ..., N-1 are the modulation symbols and $c_k$=0, ..., L-1 is the code used by the transmitter. This code can be part of a family of orthogonal codes enabling signals transmitted by different transmitters to be separated by the receiver, in a known manner per se.

Unlike the first embodiment, the unit period to be considered for estimating and correcting the time offset with the received signal is no longer the repetition period $T_c$ but the symbol period $LT_c$, a symbol being here transmitted on L repetition periods.

$$r(t) = \sum_{i=0}^{N-1} \rho(t - kLT_c)\exp(j2\pi(f_0 - f_1)t - j2\pi f_0 kLT_c + j(\varphi_0 - \varphi_1)) + n_1(t) \tag{22}$$

where it has been set $$\rho(t) = \sum_{k=0}^{L-1} c_k p_r(t - kT_c)\exp(-j2\pi f_0 kT_c) \tag{23}$$

It will be understood that the first embodiment can be considered as a particular case of the second embodiment, with one pulse per symbol period.

Figure 2B:
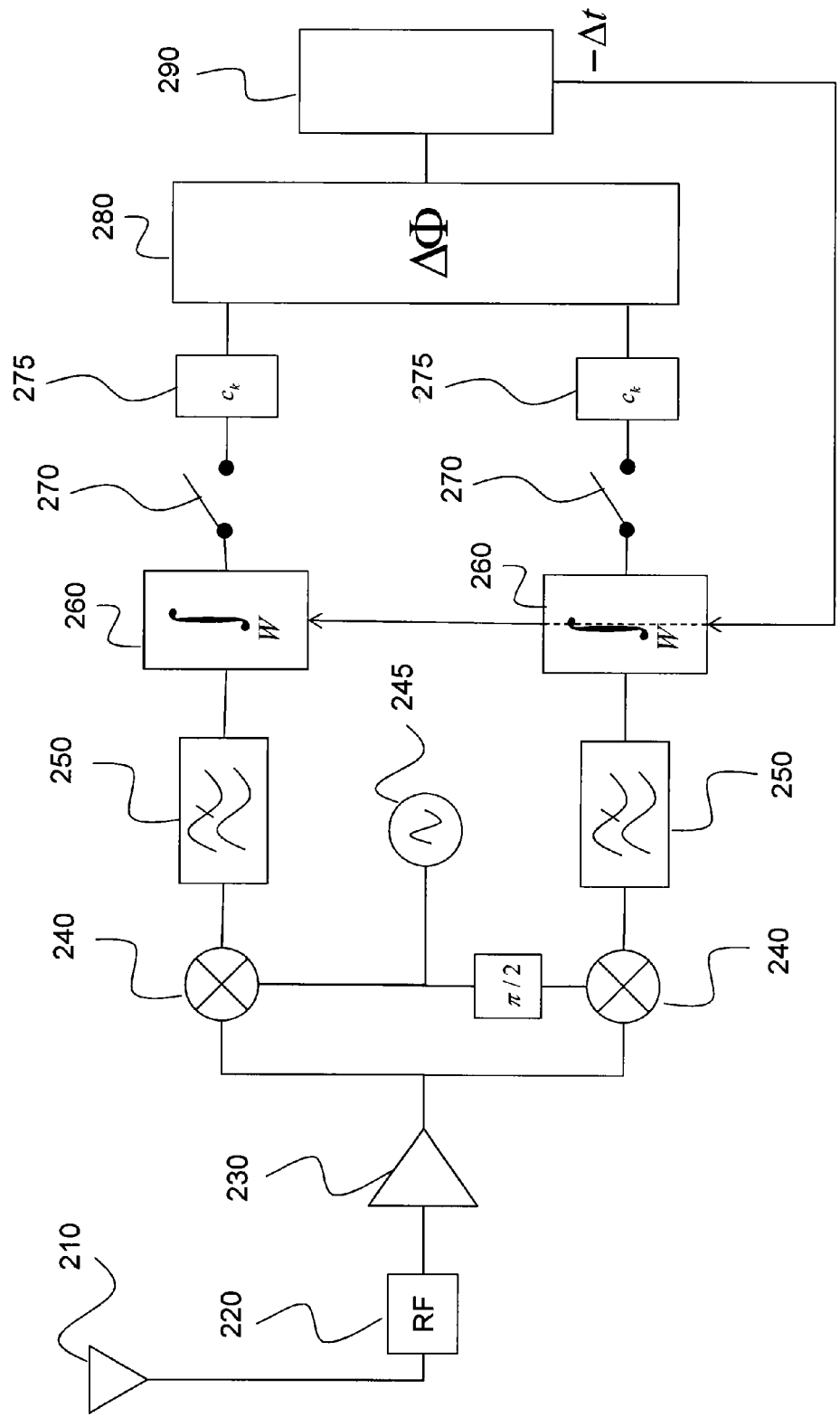
FIG. 2B schematically represents the structure of a UWB receiver according to a second embodiment of the invention.

FIG. 2B schematically illustrates the structure of a UWB receiver according to a second embodiment of the invention. Elements bearing the same references as FIG. 2A are identical to those already described.

Unlike the receiver of FIG. 2A, the receiver comprises a correlation stage 275 with the code used by the transmitter. This stage, which comprises correlators identical on the channels I and Q, can be made in a digital form, after sampling, or in an analog form, downstream the same. This second embodiment assumes that an initial synchronization has been performed with the code of the transmitter.

In any case, if $r_w[n]$ represents again the $n^{th}$ sample at the input of the phase shift detector 280, there is the relationship:

$$r_w[n+q] = a_m^{(i+1)} \cdot a_m^{(i)} \times r_w[n] \times \exp(-j2\pi f_1 LT_c) \tag{24}$$

with the same notation conventions as previously and where $a_m^{(i)}$ and $a_m^{(i+1)}$ are two successive modulation symbols. It will be noted that the period at which the samples are provided to the phase shift detector is herein $LT_1$ to take the correlation with the transmitter code into account.

It is assumed that the modulation symbols $a_m^{(i)}$ are BPSK or DBPSK symbols and thus that $a_m^{(i)} = \pm 1$. As a result, there is $a_m^{(i+1)} \cdot a_m^{(i)} = \pm 1$ and the phase shift can be estimated modulo $\pi$:

$$\Delta\phi = -2\pi QL\delta[\pi] \tag{25}$$

It will be understood that if a modulation alphabet with a higher order is used, for example a modulation alphabet 4-PSK, the phase shift will be estimated modulo a fraction of $\pi$.

According to a first alternative, the control means correct the beginning of the integration windows, and optionally, the sampling instants, by a time $(\Delta\Phi/2\pi Q)LT_1$, with a periodicity $LT_1$.

According to a second alternative, the phase shifts can be accumulated on a plurality $n_T$ of periods of duration $$LT_1, \text{ that is } \Delta\Phi = \sum_{n=0}^{n_T-1} \Delta\phi_n.$$

The time sliding after a time $n_T LT_1$ is deduced therefrom as previously:

$$\Delta t = (-\Delta\Phi/2\pi Q)LT_1 \tag{26}$$

the time sliding being determined unambiguously if $$|\delta| < \frac{1}{4LQ}.$$

As in the first alternative, the control means, 290, offset the beginning of the integration windows and, correlatively, of the sampling instants, as a function of the phase shift determined by the detector 280. The time offset is applied by said control means with a periodicity $n_T LT_1$.

Alternatively, as in the first embodiment, the time sliding can be cumulated until it reaches a sampling period $T_w$, the integration windows being then offset by this period.

The initial synchronization of the receiver can be achieved using a pilot sequence.

Once the receiver is synchronized using the pilot sequence, the receiver can go on correcting any time drift by readjusting all the intervals $LT_1$, or $n_T LT_1$, as explained above.

It is understood that thus the receiver remains permanently adjusted on the symbol periods of the received signal, the samples at the output of the sampling stage, or when the same is followed by a correlation stage, the correlation results can then be processed to estimate the modulation symbols $a_m^{(i)}$.

According to an alternative of the second embodiment, the transmitted signal is modulated by means of symbols belonging to a PPM (Pulse Position Modulation) alphabet. If a transmitter coding is used, the transmitted signal is given by the expression (6) and to simplify the presentation, in the absence of such a coding:

$$s_{Tx}(t) = \sum_{i=0}^{N-1} p(t - iT_c - m^{(i)}\varepsilon)\cos(2\pi f_0(t - iT_c - m^{(i)}\varepsilon) + \varphi_0) \quad (27)$$

If the modulation alphabet is 2-PPM, $$\varepsilon = \frac{T_c}{2}$$

and $m \in \{0,1\}$ are preferably chosen. For example, a bit value equal to 0 will be coded by the position 0 and a bit value equal to 1 will be coded by the position $$\frac{T_c}{2},$$

in other words, a bit equal to 0 will be reflected by a pulse in the first part of the period and a bit equal to 1 will be reflected by a pulse in the second part of the period.

The signal received by the receiver will then be, still assuming that the transmission channel is AWGN:

$$r(t) = \quad (28)$$
$$\sum_{i=0}^{N-1} p\left(t - iT_c - m^{(i)}\frac{T_c}{2}\right)\exp(2\pi j(f_0 - f_1)t - j\pi m^{(i)}T_c + j(\varphi_0 - \varphi_1)) + n_1(t)$$

By detecting the energy of the received signal, it can be determined whether a pulse is present in the first or second part of the period, and $m^{(i)}$ can be estimated. The phase sliding between two consecutive samples can then be estimated within $2\pi$:

$$\Delta\phi = -2\pi QL^*\delta[\pi] \quad (29)$$

where $L^*$ is:
  0.5 if the consecutive samples correspond to a sequence 10;
  1 if the consecutive samples correspond to a sequence 00 or 11;
  1.5 if the consecutive samples correspond to a sequence 01.

The time offset of the integration time windows is then carried out as previously described.

The invention claimed is:

1. A receiver for receiving a pulsed UWB signal transmitting symbols with a first period ($T_c$,$LT_c$), modulated by a carrier frequency ($f_0$), the receiver comprising:
   a quadrature mixer translating in baseband the pulsed UWB signal, from a signal of a local oscillator of a frequency ($f_1$) equal, within a frequency offset, to the carrier frequency;
   an integration stage integrating the signal thus translated in baseband, during successive time windows being repeated with a second period ($T_w$) the first period being equal, within a time offset, to a multiple (q,Lq) of the second period;
   a sampling stage sampling the signal thus integrated, a sample representing the integration result of the signal translated on the second period;
   a phase estimator estimating a phase shift between two samples of the integrated signal, which are separated by the multiple of the second period;
   control means applying a time offset to the time windows of the integration stage as a function of the phase shift previously estimated.

2. The receiver according to claim 1, further comprising, upstream of the quadrature mixer, an RF filter followed by a low noise amplifier.

3. The receiver according to claim 1, wherein the quadrature mixer is followed by a low-pass filtering stage upstream of the integration stage.

4. The receiver according to claim 1, wherein the pulsed signal comprises a pulse being repeated with the first period $T_c$ and the integration windows are repeated with the second period $T_w$, substantially lower than $T_c$, the phase estimator estimating the phase shift, $\Delta\phi$, between two samples of the integrated signal, which are separated by a time interval $T_1 = qT_w$, where q is an integer, the deviation $T_1 - T_c$ defining the time offset.

5. The receiver according to claim 4, wherein the control means applies to the integration windows a time offset $-\delta t = (\Delta\phi/2\pi Q)T_1$, where Q is an integer equal to the product of the time interval $T_1$ by the frequency ($f_1$) of the local oscillator, the time offset being applied with a periodicity $T_1$.

6. The receiver according to claim 4, wherein the control means accumulates the phase shifts provided by the phase estimator for a plurality $n_T$ of the successive time intervals, to obtain a cumulative phase shift $\Delta\Phi$, and applies to the integration windows a time offset $-\Delta t = (\Delta\Phi/2\pi Q)T_1$, where Q is an integer equal to the product of the time interval $T_1$ by the frequency ($f_1$) of the local oscillator, the time offset being applied with a periodicity $n_T T_1$.

7. The receiver according to claim 4, wherein the control means accumulates the phase shifts provided by the phase estimator for a plurality of the successive time intervals, to obtain a cumulative phase shift ΔΦ, until the time offset −Δt=(ΔΦ/2πQ)T₁ corresponds to a value equal to the second period, where Q is an integer equal to the product of the time interval T₁ by the frequency (f₁) of the local oscillator, a time offset of this second period being then applied when this value is reached.

8. The receiver according to claim 1, wherein the pulsed signal comprises a series of L pulses separated by a period T_c, the series being repeated with the first period LT_c, each series of pulses being coded using a coding sequence (c_k) and modulated by a modulation symbol (a_m^(i)), and the integration windows are repeated with the second period T_w, substantially lower than T_c, the phase estimator estimating the phase shift, Δφ, between two samples of the integrated signal, which are separated by a time interval T₁=qLT_w, where q is an integer, the deviation L(T₁−T_c) defining the time offset.

9. The receiver according to claim 8, wherein the control means applies to the integration windows a time offset −Δt=(Δφ/2πQ)LT₁, where Q is an integer equal to the product of the time interval T₁ by the frequency (f₁) of the local oscillator, the time offset being applied with a periodicity LT₁.

10. The receiver according to claim 8, wherein the control means accumulate the phase shifts provided by the phase estimator for a plurality n_T of the successive time intervals, to obtain a cumulative phase shift ΔΦ, and applies to the integration windows a time offset −Δt=(ΔΦ/2πQ)LT₁, where Q is an integer equal to the product of the time interval T₁ by the frequency (f₁) of the local oscillator, the time offset being applied with a periodicity n_T LT₁.

11. The receiver according to claim 8, wherein the control means accumulates the phase shifts provided by the phase estimator for a plurality of the successive time intervals, to obtain a cumulative phase shift ΔΦ, until the time offset −Δt=(ΔΦ/2πQ)LT₁ corresponds to a value equal to the second period, where Q is an integer equal to the product of the time interval T₁ by the frequency (f₁) of the local oscillator, a time offset of the second period being then applied when this value is reached.

12. A method for receiving a pulsed UWB signal transmitting symbols with a first period (T_c, LT_c), modulated by a carrier frequency (f₀), the method comprising:
    quadrature mixing for translating in baseband the pulsed UWB signal, from the signal of a local oscillator of a frequency (f₁) equal, within a frequency offset, to the carrier frequency;
    integrating the signal thus translated in baseband, for successive time windows being repeated with a second period (T_w), the first period being equal, within a time offset, to a multiple (q,Lq) of the second period;
    sampling the signal thus integrated, a sample representing the integration result of the signal translated on the second period;
    phase estimating for estimating a phase shift between two samples of the integrated signal, which are separated by the multiple of the second period;
    applying a time offset to the time windows of the integration stage as a function of the phase shift previously estimated.

13. The reception method according to claim 12, wherein the pulsed signal comprises a pulse being repeated with the first period T_c and the integration windows are repeated with a second period T_w, substantially lower than T_c, the phase estimation estimating the phase shift, Δφ, between two samples of the integrated signal, which are separated by a time interval T₁=qT_w, where q is an integer, the deviation T₁−T_c defining the time offset.

14. The reception method according to claim 13, wherein the time offset is obtained by −Δt=(Δφ/2πQ)T₁, where Q is an integer equal to the product of the time interval T₁ by the frequency (f₁) of the local oscillator, the time offset being applied with a periodicity T₁.

15. The reception method according to claim 13, wherein, for a plurality n_T of the successive time intervals, the phase shifts provided by the phase estimation are accumulated, to obtain a cumulative phase shift ΔΦ, and to the integration windows is applied a time offset −Δt=(ΔΦ/2πQ)T₁, where Q is an integer equal to the product of the time interval T₁ by the frequency (f₁) of the local oscillator, the time offset being applied with a periodicity n_T T₁.

16. The reception method according to claim 13, wherein, for a plurality of the successive time intervals, the phase shifts provided by the phase estimation are accumulated, to obtain a cumulative phase shift ΔΦ, until the time offset −Δt=(ΔΦ/2πQ)T₁ corresponds to a value equal to the second period, where Q is an integer equal to the product of the time interval T₁ by the frequency (f₁) of the local oscillator, a time offset of the second period being then applied when this value is reached.

17. The reception method according to claim 12, wherein the pulsed signal comprises a series of L pulses separated by a period T_c, the series being repeated with the first period LT_c, each series of pulses being coded using a coding sequence (c_k) and modulated by a modulation symbol (a_m^(i)), and the integration windows are repeated with the second period T_w, substantially lower than T_c, the phase estimation estimating the phase shift, Δφ, between two samples of the integrated signal, which are separated by a time interval T₁=qLT_w, where q is an integer, the deviation L(T₁−T_c) defining the time offset.

18. The reception method according to claim 17, wherein to the integration windows is applied a time offset −Δt=(Δφ/2πQ)LT₁, where Q is an integer equal to the product of the time interval T₁ by the frequency (f₁) of the local oscillator, the time offset being applied with a periodicity LT₁.

* * * * *